(12) United States Patent
Murata

(10) Patent No.: US 7,130,103 B2
(45) Date of Patent: Oct. 31, 2006

(54) OPTICAL MODULATOR AND MANUFACTURING METHOD OF OPTICAL MODULATOR

(75) Inventor: Akihiro Murata, Suwa (JP)

(73) Assignee: Seiko Epson Corporation (JP)

( * ) Notice: Subject to any disclaimer, the term of this patent is extended or adjusted under 35 U.S.C. 154(b) by 89 days.

(21) Appl. No.: 11/059,605

(22) Filed: Feb. 16, 2005

(65) Prior Publication Data

US 2005/0195463 A1    Sep. 8, 2005

(30) Foreign Application Priority Data

Mar. 8, 2004  (JP)  ............... 2004-064343

(51) Int. Cl.
*G02B 26/00* (2006.01)
*G02F 1/03* (2006.01)
*C23F 1/00* (2006.01)

(52) U.S. Cl. ............ 359/290; 359/291; 359/295; 359/245; 216/2; 385/147

(58) Field of Classification Search ........ 359/290–295, 359/245–247, 850, 872; 216/2, 79; 385/18, 385/147; 438/48, 52, 72, 107; 257/80
See application file for complete search history.

(56) References Cited

U.S. PATENT DOCUMENTS 6,341,039 B1    1/2002  Flanders et al.
6,674,562 B1 *  1/2004  Miles ................ 359/291
6,787,051 B1 *  9/2004  Silverbrook ........... 216/27
6,867,896 B1 *  3/2005  Miles ................ 359/290
6,942,814 B1 *  9/2005  Wood et al. ........... 216/24
6,947,195 B1 *  9/2005  Ohtaka et al. .......... 359/290
7,034,981 B1 *  4/2006  Makigaki ............. 359/290

FOREIGN PATENT DOCUMENTS

JP   2002-174721   6/2002

* cited by examiner

*Primary Examiner*—Loha Ben
(74) *Attorney, Agent, or Firm*—Harness, Dickey & Pierce, P.L.C.

(57) ABSTRACT

Provided is an optical modulator capable of forming an optical gap easily and accurately without having to perform underetching to the sacrifice layer. An optical modulator includes a first substrate provided with a first concave portion in which the bottom part becomes a moving part, and a movable reflection film being formed on the moving part; and a second substrate provided with a second concave portion having a diameter that is smaller than the diameter of the first concave portion at a position facing the first concave portion, and a fixed reflection film being formed on the bottom part of the second concave portion; wherein the depth of the first concave portion prescribes the movable range of the movable reflection film, and an optical gap is prescribed based on the spacing between movable reflection film and the fixed reflection film.

19 Claims, 8 Drawing Sheets

OPTICAL MODULATOR AND MANUFACTURING METHOD OF OPTICAL MODULATOR

CROSS-REFERENCE TO RELATED APPLICATION

The entire disclosure of Japanese Patent Application No. 2004-64343 filed on Mar. 8, 2004 including specification, claims, drawings and summary are incorporated herein by reference in its entirety.

BACKGROUND OF THE INVENTION

1. Field of the Invention

The present invention generally relates to technology for modulating light to be transmitted and, in particular, it relates to an optical modulator employing coherent optical modulation and the manufacturing method thereof.

2. Description of the Related Art

An optical modulator is a device for generating the required optical power, color and the like in the passing light by changing optical parameters such as the transmission factor, refractive index, reflection factor, degree of deflection and coherency of light in the optical system according to the modulating signal. For example, with an optical modulator employing the interference of light, light waves having different optical paths are superposed with a movable reflection film in which the position thereof changes minimally pursuant to a modulating signal so as to change the intensity and color of light with the interference of both waves. With this kind of coherent optical modulator, a mechanism for accurately displacing the position of the movable reflection film becomes necessary.

For instance, with the optical modulator described in Japanese Patent Laid-Open Publication No. 2002-174721 (JP '721), an optical gap is formed by providing a sacrifice layer between the substrate (fixed reflection film) and movable reflection film, and thereafter removing this sacrifice layer via underetching.

Further, with the optical modulator described in the specification of U.S. Pat. No. 6,341,039, an optical gap is formed by using a substrate in which one face of a silicon wafer is oxidized and a silicon layer is further affixed to the face to which the oxidized layer has been formed, and performing underetching with this oxidized layer as the sacrifice layer.

Nevertheless, with the method described in JP '721, since the initial spacing of the optical gap will be prescribed based on the thickness of the sacrifice layer, there are cases where this initial spacing will show variations depending on the forming conditions of such sacrifice layer. Thus, fluctuations will also arise in the electrostatic force working between the drive electrode (fixed electrode) formed on the side of the fixed reflection film, and the movable reflection film, and it will become difficult to stabilize the drive. Further, with this method, the working process will become complicated since the processes of deposition and sacrifice layer etching are repeated.

Moreover, with the optical modulators described in the above prior art, they both form the optical gap by removing the sacrifice layer via underetching. In order to perform underetching to the sacrifice layer and to release the moving part forming the movable reflection film, it is necessary to form a release hole in the moving part for introducing the etching solution into the sacrifice layer. Thus, the area to which the electrostatic force works to drive the moving part will decrease, and the drive voltage will increase. In addition, when the optical gap is reduced, there are cases where sticking phenomenon will occur due to the surface tension of the etching solution between the movable reflection film and the fixed reflection film upon releasing the moving part.

Therefore, in order to overcome the foregoing drawbacks, a constitution that does not require the underetching of the sacrifice layer is being sought.

SUMMARY OF THE INVENTION

Thus, an object of the present invention is to provide an optical modulator capable of forming an optical gap easily and accurately without having to perform underetching to the sacrifice layer.

In order to achieve the foregoing object, the present invention provides a optical modulator, comprising: a first substrate provided with a first concave portion in which the bottom part becomes a moving part, and a movable reflection film being formed on the moving part; and a second substrate provided with a second concave portion having a diameter that is smaller than the diameter of the first concave portion at a position facing the first concave portion, and a fixed reflection film being formed on the bottom part of the second concave portion; wherein the depth of the first concave portion prescribes the movable range of the movable reflection film, and an optical gap is prescribed based on the spacing between the movable reflection film and the fixed reflection film.

With the optical modulator of the present invention, since an optical gap is formed for determining the wavelength of light to be emitted based on a first substrate having a first concave portion and a second substrate having a second concave portion, there is no need to perform underetching to the sacrifice layer. Thus, there is no need to form a release hole for introducing the etching solution into the sacrifice layer, and it will not be necessary to reduce the area which works the power for driving the movable reflection film. Further, this will also prevent problems such as sticking phenomenon caused by the surface tension of the etching solution arising between the movable reflection film and fixed reflection film. Moreover, since the manufacture of the optical modulator will be possible by bonding the substrates having a concave portion formed thereon, such manufacture can be simplified. In addition, with the conventional method of forming a sacrifice layer, forming a movable reflection film thereon, and thereafter removing the sacrifice layer, variations in the gap would occur depending on the deposition conditions of the sacrifice layer. With the present invention, however, since the depth of the formed concave portion will in itself prescribe the initial spacing of the movable reflection film and fixed reflection film without having to go through the sacrifice layer, the initial spacing of the optical gap between the movable reflection film and fixed reflection film can be controlled accurately.

For example, preferably, a silicon substrate may be used as the first substrate and a glass substrate may be used as the second substrate. When using a silicon substrate as the first substrate and a glass substrate as the second substrate, etching may be used to form the first concave portion and second concave portion. Thus, it will be possible to form a concave portion that accurately prescribes the initial spacing between the movable reflection film and fixed reflection film.

Further, the first substrate may be a laminated layer comprising an insulating layer between a plurality of silicon layers, and the second substrate may be a glass substrate.

When employing a laminated substrate comprising an insulating layer between a plurality of silicon layers, it will be possible to use the insulating layer as an etching stopper. Thus, the depth of the first concave portion for prescribing the movable range of the movable reflection film and the initial spacing between the movable reflection film and fixed reflection film can be managed more easily.

Further, a biasing means for biasing the moving part toward the bottom part of the concave portion may also be provided. As this kind of biasing means, the moving part may be an electrode, and, by providing an electrode to the bottom part of the concave portion, the electrostatic force generated by the two electrodes may be used. Moreover, the biasing means may also employ electromagnetic force.

Further, preferably, the moving part is constituted to be drivable with the electrostatic force generated by applying voltage to the moving part and the electrode provided to the second substrate. According to this constitution, the moving part can be driven with a simple structure.

Further, preferably, the electrode to be provided to the second substrate is formed at the periphery of the second concave portion of the second substrate so as to be included in an area corresponding to the first concave portion of the first substrate. According to this constitution, since it will be possible to shorten the distance between the moving part and the electrode to be provided to the second substrate while broadening the interval (gap) between the movable reflection film and fixed reflection film, the driving power for driving the moving part can be reduced. In other words, since the size of the diameter of the first concave portion of the first substrate and the second concave portion of the second substrate is different, a step will be formed with the first concave portion and second concave portion. As a result of using this step to form a working part such as an electrostatic electrode which generates power for driving the movable reflection film at the periphery of the second concave portion of the second substrate, the distance between the working part and movable reflection film (e.g., electrostatic gap) can be shortened while broadly securing the area that can be used for modulating light, and the driving power can be reduced thereby.

Preferably, the movable reflection film is formed on the overall face facing the second concave portion of the moving part, and the movable reflection film possesses electric insulation. In the present invention, since the movable reflection film is formed on the bottom part to become the moving part of the first concave portion, and thereafter bonded with the second substrate for the manufacture of the optical modulator so as to form the gap, the movable reflection film can be formed on the overall face of the moving part. Therefore, it is possible to avoid problems such as short circuits and fusion arising as a result of the moving part coming in direct contact with the electrode formed on the side of the second substrate.

The first substrate may be constituted from a bottom substrate constituting the bottom part, and a frame body bonded to the bottom substrate. According to this constitution, since the thickness of the frame body can be used to prescribe the depth of the first concave portion, the depth of the first concave portion for prescribing the movable range of the movable reflection film can be controlled more accurately.

In another mode of the present invention, provided is a manufacturing method of an optical modulator, comprising: a first step of etching one face of a first substrate so as to form a first concave portion for prescribing the movable range of a movable reflection film; a second step of etching one face of a second substrate so as to form a second concave portion having a diameter that is smaller than the first concave portion; a third step of bonding the first substrate and the second substrate such that the first concave portion and the second concave portion face each other; and a fourth step of removing a bottom part of the first concave portion while leaving an area to become a moving part so as to form a moving part to the bottom part.

According to the foregoing constitution, since a gap for modulating light is formed via etching to the first substrate and second substrate, respectively, the distance of the gap can be controlled easily, and a high-precision optical modulator can be manufactured without difficulty. Further, a step part can be easily formed as a result of forming concave portions having different diameters to the first substrate and second substrate. As a result of using this step part to form a working part such as an electrode for generating power to drive the movable reflection film at the periphery of the second concave portion of the second substrate, for example, it will be possible to shorten the distance between the working part and the movable reflection film while broadly securing the area that may be used for modulating light, and an optical modulator capable of reducing the driving power may be provided thereby. Incidentally, the order of the first step and second step is irrelevant, and may be performed simultaneously.

Preferably, the first substrate is a silicon substrate, and the second substrate is a glass substrate. According to this constitution, the concave portion can be formed more accurately with etching. Further, by employing glass containing alkali metals such as borosilicate glass as the glass substrate, the first substrate and second substrate can be subject to anodic bonding, and bonding can be conducted easily.

Preferably, the first substrate is a laminated layer comprising an insulating layer between a plurality of silicon layers, and the first concave portion is formed by using the insulating layer as an etching stopper in the first step. According to this constitution, since the insulating layer may be used as the etching stopper, the depth of the first concave portion for prescribing the movable range of the movable reflection film can be controlled more easily.

Preferably, the first substrate has at least a double-layered insulating layer between a plurality of silicon layers, and further comprises a step of forming a third concave portion by using the insulating layer as an etching stopper at a position corresponding to the first concave portion of the face opposite to the face to which the first concave portion of the first substrate is formed in the first step. According to this constitution, since the first substrate will be constituted from a laminated substrate having a plurality of layer structures, the strength of the first substrate can be improved, and the handling during the manufacture can be facilitated.

Preferably, at least in the third step, a removable support member for supporting the first substrate is mounted on the first substrate. According to the foregoing constitution, the handling of the first substrate can be facilitated.

Preferably, before the third step, an electrode is formed in the periphery of the second concave portion of the glass substrate obtained in the second step and at a position facing the first concave portion. According to this constitution, the electrode for driving the movable reflection film can be formed at a position in the vicinity of the movable reflection film.

Preferably, before the third step, a reflecting layer to become a movable reflection film is formed at the bottom face of the first concave portion. According to this constitution, the movable reflection film can be formed across the overall area to become the moving part behind the first concave portion. Thereby, it will be possible to provide an optical modulator capable of avoiding an electrical short circuit caused by the electrode on the moving part side during the drive directly contacting the electrode on the second substrate side.

In another mode of the present invention, provided is a manufacturing method of an optical modulator, comprising: a first step of forming a concave portion by etching one face of a glass substrate; a second step of bonding a first silicon substrate to the face to which the concave portion of the glass substrate is formed; a third step of forming a pore that is larger than the concave portion at a position corresponding to the concave portion of the first silicon substrate; a fourth step of bonding a second silicon substrate to a face on the opposite side of the first silicon substrate; and a fifth step of removing the second silicon substrate while leaving an area to become a moving part so as to form a moving part to the second silicon substrate.

According to the above, as a result of forming a pore in the first silicon substrate having a prescribed thickness, the movable range of the movable reflection film can be controlled more accurately.

Preferably, at least in the fourth step, a removable support member for supporting the second silicon substrate is mounted on the second silicon substrate. According to this constitution, the handling of the second silicon substrate can be facilitated.

In another mode of the present invention, provided is an optical modulator, comprising: a first substrate constituted from a material capable of transmitting light and having a concave portion formed thereon; a second substrate having a moving part formed thereon for covering the concave portion; a fixed reflection film formed at the bottom part of the concave portion; a movable reflection film formed to the moving part; a biasing means for biasing the moving part to the bottom part of the concave portion; and a stopper for retaining the movable reflection film and the fixed reflection film at a predetermined interval; wherein the wavelength of light to be emitted can be determined based on the interval between the movable reflection film and the fixed reflection film.

According to the constitution of the present invention, since an optical gap is formed for determining the wavelength of light to be emitted based on a first substrate having a concave portion and a second substrate having a moving part, there is no need to perform underetching to the sacrifice layer. Thus, there is no need to form a release hole for introducing the etching solution into the sacrifice layer, and it will not be necessary to reduce the area which works the power for driving the movable reflection film. Further, this will also prevent problems such as sticking phenomenon caused by the surface tension of the etching solution arising between the movable reflection film and fixed reflection film. Moreover, since the manufacture of the optical modulator will be possible by bonding the substrates having a concave portion formed thereon, such manufacture can be simplified. In addition, with the conventional method of forming a sacrifice layer, forming a movable reflection film thereon, and thereafter removing the sacrifice layer, variations in the gap would occur depending on the deposition conditions of the sacrifice layer. With the present invention, however, since the depth of the formed concave portion will in itself prescribe the initial spacing of the movable reflection film and the fixed reflection film without having to go through the sacrifice layer, the initial spacing of the optical gap between the movable reflection film and fixed reflection film can be controlled accurately.

The stopper may be a step formed along the edge of the concave portion. This kind of step can be formed by performing etching in two phases. Specifically, the first concave portion is formed with the first etching, and, by further performing etching to the bottom part of such first concave portion, a concave portion that is smaller than the diameter of the first concave portion can be formed.

Preferably, the biasing means is a drive electrode formed along the edge of the concave portion. According to this constitution, the moving part can be driven with a simple structure.

DETAILED DESCRIPTION OF THE PREFERRED EMBODIMENTS

The present invention is now explained in detail with reference to the drawings.

<First Embodiment>

Figure 1A:
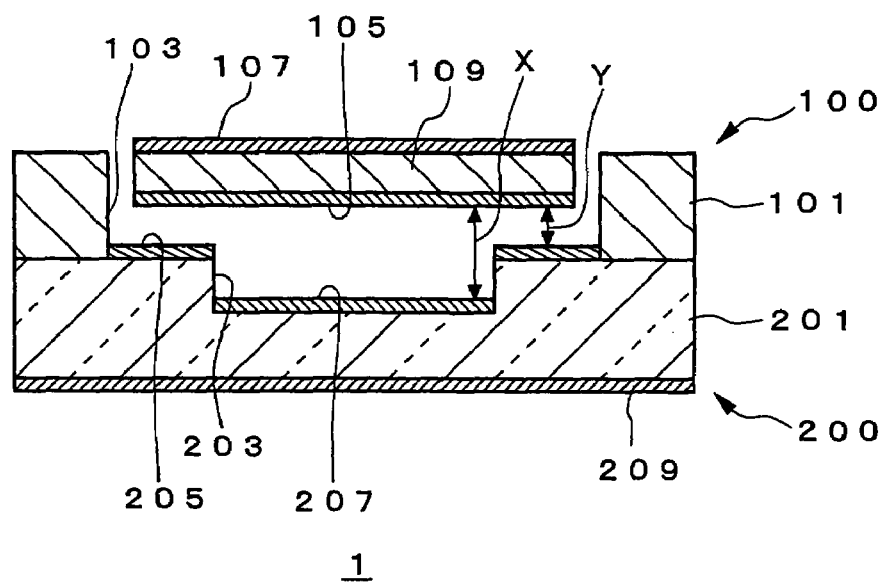
FIG. 1(A) and FIG. 1(B) are diagrams showing an example of the optical modulator according to the present invention.
Figure 1B:
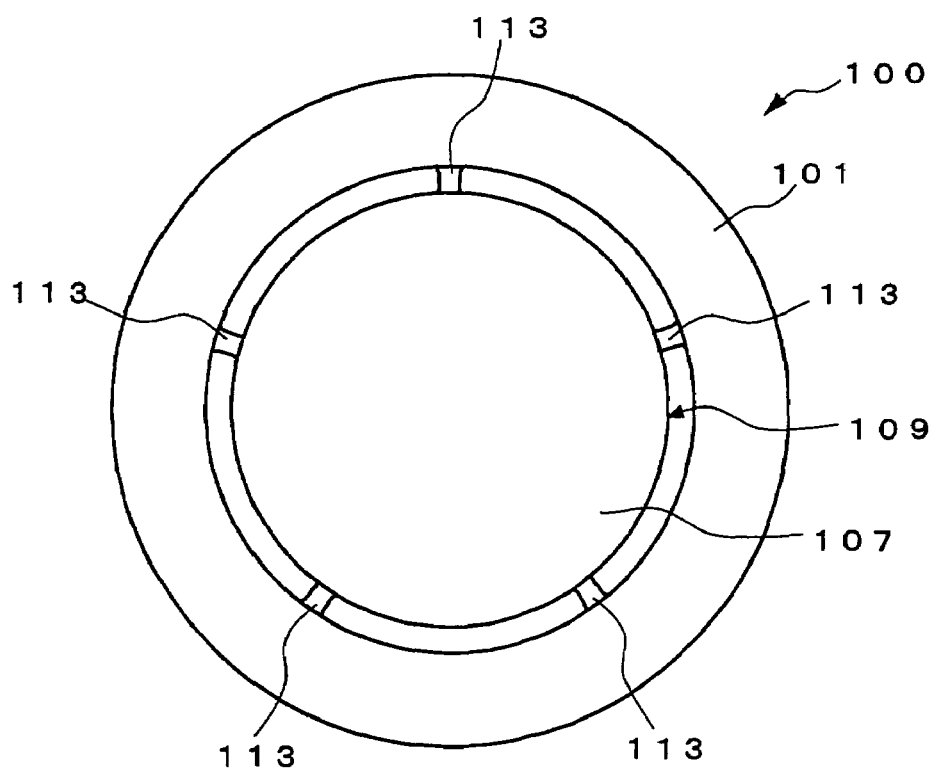

FIG. 1 is a diagram showing an example of the optical modulator according to the present invention, wherein FIG. 1(A) is a cross section, and FIG. 1(B) is a plan view.

As shown in FIG. 1(A), an optical modulator 1 is constituting by comprising a first substrate 100 provided with a concave portion 103 in which the bottom part becomes the moving part 109, and a movable reflection film 105 being provided to this moving part 109, and a second substrate 200 provided with a concave portion 203 having a diameter that is smaller than the diameter of the concave portion 103 at a position facing the concave portion 103, and a fixed reflection film 207 being formed on the bottom part of the concave portion 203.

The optical modulator of the present embodiment is constituted to be capable of driving the moving part 109 as a result of generating electrostatic force by applying an alternating current between the moving part 109 and the fixed electrode 205 provided to the second substrate 200 from an external power source not shown. Voltage is applied to the moving part 109 via a hinge part 113, and voltage is applied to the fixed electrode 205 via a wiring (not shown).

With the optical modulator 1 of the present embodiment, the total distance of the depth of the concave portion 103 and the depth of the concave portion 203 prescribes the initial spacing h of the optical gap X. The optical gap X is used for reflecting the light emitted from the side of the moving part 109 one or a plurality of times between the movable reflection film 105 and fixed reflection film 207. Here, the initial spacing h is the distance between the movable reflection film 105 and fixed reflection film 207 in a case where the voltage is not being applied.

With optical modulator 1 of the present embodiment, as a result of the plurality of lights having different optical paths generated by being reflected between the movable reflection film 105 and fixed reflection film 207 interfering with each other, only light having a desired wavelength will be selectively emitted as the outgoing beam. In other words, light having a wavelength that does not satisfy the coherent conditions corresponding to the optical gap X will rapidly attenuate, and only light having a wavelength satisfying the coherent conditions will remain and be emitted (Fabry-Perot interferometer principle). Therefore, by changing the drive voltage and displacing the position of the movable reflection film 105, the wavelength of light to be transmitted can be selected according to the optical gap X.

Figure 8:
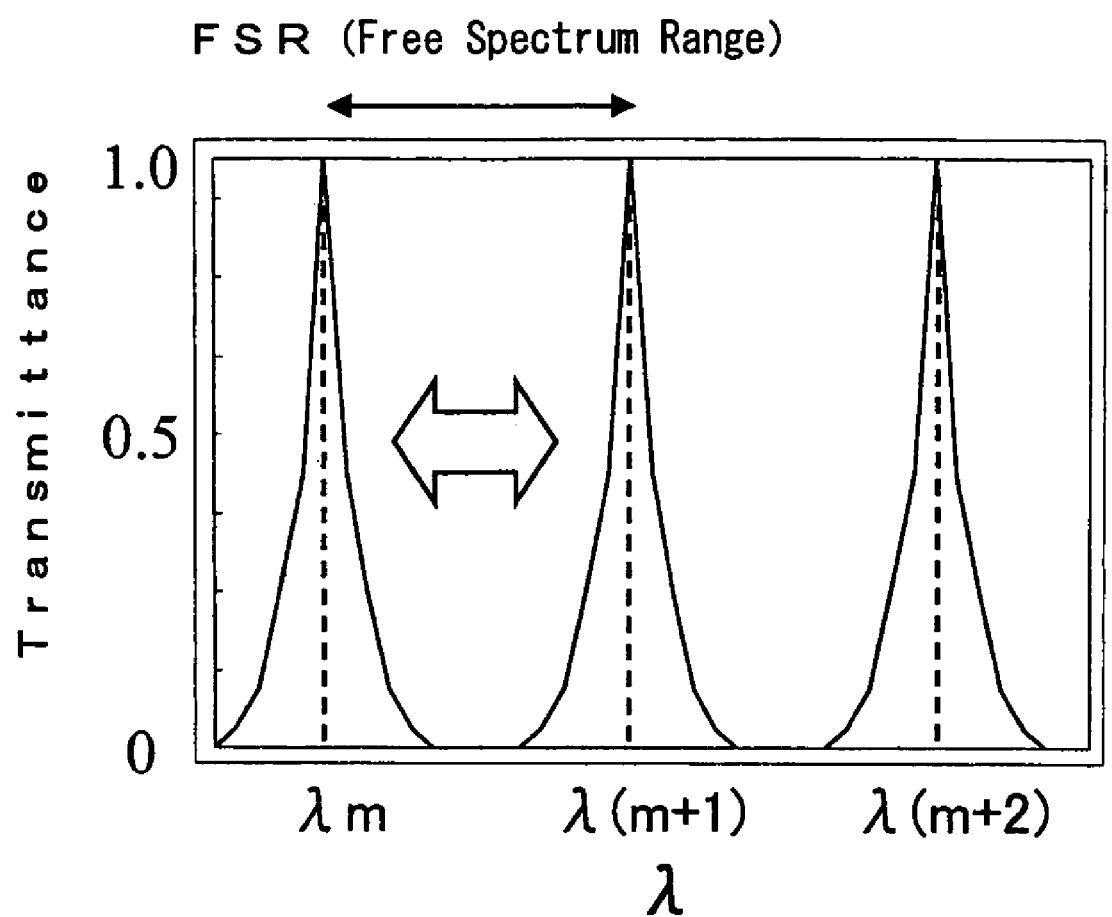
FIG. 8 is a diagram for explaining the free spectrum range.

FIG. 8 is a diagram for explaining the free spectrum range. In the present embodiment, the initial spacing h of this optical gap is determined based on FSR (Free Spectrum Range). FSR is a range of wavelength $\lambda\Delta$ which can be determined without different orders of spectrums overlapping and without ambiguity, and, for example, is a range shown in FIG. 8.

The distance (initial spacing h) between the movable reflection film 105 formed on the bottom part of the concave portion 103 and the fixed reflection film 207 formed on the bottom part of the concave portion 203, for example, can be determined from the following formula:

$$h=\lambda_m^2/(2n\Delta\lambda)$$

Here, m is a positive integer with the order of interference, $\lambda$ is the wavelength of light in the m order, $\Delta\lambda$ is the difference of the wavelength of the m+1 order and the m order, and n is the refractive index of the medium between the movable reflection film 105 and the fixed reflection film 207.

Further, the moving distance $\Delta h$ of the movable reflection film 105 required for selectively transmitting the desired outgoing beam, for example, can be sought with the following formula:

$$\Delta\lambda=\lambda_{m+1}-\lambda_m=\lambda_m^2/(2nh)=\Delta h(\lambda_m/h)$$

The initial spacing h of the optical gap and the moving distance $\Delta h$ are prescribed based on the value calculated with the foregoing formula.

Further, the movable range, which is the maximum width of the moving distance $\Delta h$ of the movable reflection film 105, is prescribed with the depth of the concave portion 103. Moreover, the depth of the concave portion 103 will also prescribe the distance between the electrodes (electrostatic gap Y) for working the electrostatic force.

Next, the manufacturing method of the optical modulator 1 pertaining to the present embodiment is explained.

FIG. 2 and FIG. 3 are process drawings for explaining the formation method of the optical modulator of the present embodiment.

(Preparation of Second Substrate)

Figure 2A:
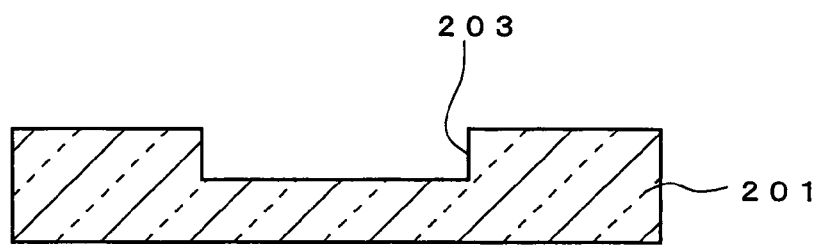
FIG. 2(A) to FIG. 2(C) illustrate process steps for forming the optical modulator pertaining to the present embodiment.

As shown in FIG. 2(A), a concave portion 203 is formed on a substrate 201 constituted from a light transmitting material such as Pyrex (registered trademark) glass or quartz glass capable of transmitting desired light.

When employing anodic bonding in the subsequent bonding process with the first substrate 100, it is preferable to use glass containing alkali metals such as sodium (Na), for instance, as the substrate 201. As this kind of glass, for example, borosilicate glass can be used, and, specifically, Pyrex (registered trademark) glass manufactured by Corning Inc. (registered trademark) may be used. In particular, since the glass substrate will be heated upon anodic bonding, when giving consideration to the point that it is preferable to have a coefficient of thermal expansion that is roughly equal to the silicon substrate to be employed as the first substrate 100, Corning #7740 (product name) manufactured by Corning Inc. (registered trademark) is optimum.

The formation of the concave portion 203 is now explained in detail. Foremost, a laminated film of Cr (chrome)/Au (gold) (e.g., film thickness of 0.03/0.07 μm) is deposited to one face of a glass substrate 201 via sputtering or the like so as to form an etching protective layer not shown. Patterning is performed to this etching protective layer with the photolithography technique such that the area to which the concave portion 203 is formed will open. Next, the concave portion 203 is formed with wet etching employing a hydrofluoric acid etching solution such as a hydrofluoric acid solution. Thereafter, the etching protective layer is removed.

Incidentally, there is no particular limitation on the depth of the concave portion 203, and, for example, this may be roughly 1 to 100 μm, and preferably 1 to 50 μm.

Figure 2B:
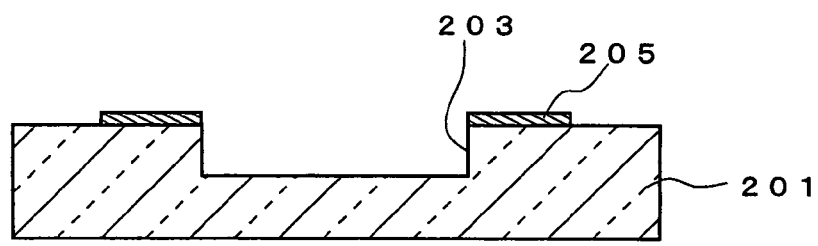

Next, as shown in FIG. 2(B), a wiring pattern containing a drive electrode (fixed electrode) 205 is formed at the periphery of the concave portion 203. The wiring pattern, for example, is formed by depositing Cr/Au via sputtering. Nevertheless, this is not limited thereto, and, as the conductive material for forming the wiring pattern, for instance, other metals or a transparent conductive material such as ITO may also be used. Further, in addition to sputtering, the evaporation method or ion plating may be used for forming the wiring pattern. Although there is no particular limitation on the thickness of the conductive layer constituting this kind of wiring pattern, for example, this may be 0.1 to 0.2 μm.

Figure 2C:
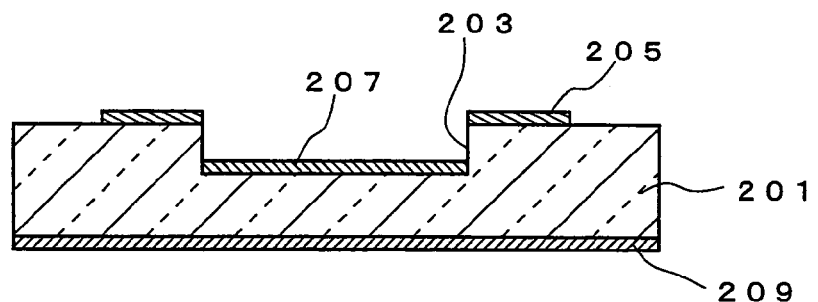

Next, as shown in FIG. 2(C), a fixed reflection film 207 is formed on the bottom face of the concave portion 203, and an antireflection film 209 is formed on the face opposite the face to which the concave portion 203 of the second substrate 200 was formed. The order of forming the fixed reflection film 207 and antireflection film 209 does not matter. Specifically, as the fixed reflection film 207 and antireflection film 209, for instance, a multilayered film in which $SiO_2$ or $Ta_2O_5$ is laminated is used, and this is formed by variously changing the film thickness of the respective films. This kind of fixed reflection film 207 and antireflection film 209 are formed, for example, with the evaporation method.

Incidentally, in the foregoing explanation, although the concave portion was formed via wet etching in the process shown in FIG. 2(A), dry etching may also be employed.

(Preparation of First Substrate)

Figure 3A:
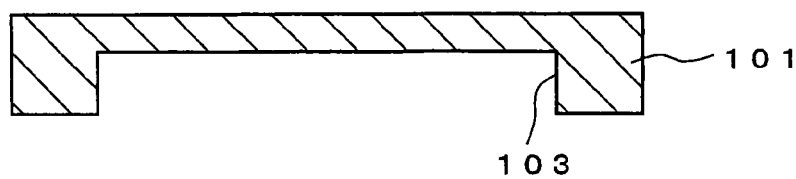
FIG. 3(A) to FIG. 3(D) illustrate process steps for forming the optical modulator pertaining to the present embodiment.

As shown in FIG. 3(A), a concave portion 103 is formed on the silicon substrate 101. For example, a resist material is applied to form a photoresist film as the etching protective film, and patterning processing is performed with the photolithography technique so as to form a prescribed pattern. Thereafter, for example, etching processing via wet etching employing an alkali solution such as KOH [solution], TMAH (tetra methyl ammonium hydroxide) solution, EPD (ethylene-propylene-diene) solution or hydrazine solution, or dry etching employing $XeF_2$, $CF_4$ or $SF_6$ is performed to form the concave portion 103.

There is no particular limitation on the depth of the concave portion 103, and this may be roughly 0.5 to 100 μm, and preferably 1 to 10 μm. The depth of the concave portion 103 will prescribe the movable range of the moving part 109 and the electrostatic gap Y.

Figure 3B:
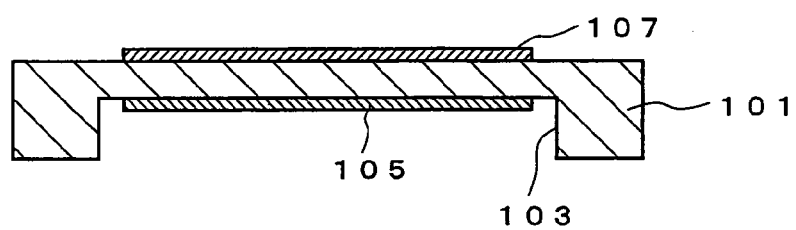

Next, as shown in FIG. 3(B), a movable reflection film 105 is formed on the bottom part of the concave portion 103, and an antireflection film 107 is formed on the face opposite to the face to which the concave portion 103 of the substrate 101 was formed. The movable reflection film 105 and antireflection film 107 are formed as with the fixed reflection film 207 and antireflection film 209. Although there is no particular limitation on the formation area of the movable reflection film 105 and antireflection film 107, preferably, these are formed by including the area to which the moving part 109, which will be formed subsequently, will contact the fixed electrode 205, and, more preferably, these are formed on the overall face facing the second substrate 200 of the moving part 109. When the movable reflection film 105 is formed from an insulation material such as $SiO_2$ or $Ta_2O_5$ as described above, and the moving part 109 is driven and pulled toward the side of the second substrate 200, it is possible to prevent the problems of electrical short circuits and fusion caused by the moving part 109 coming into direct contact with the fixed electrode 205 formed on the second substrate 200.

(Manufacturing Process of Optical Modulator)

Figure 3C:
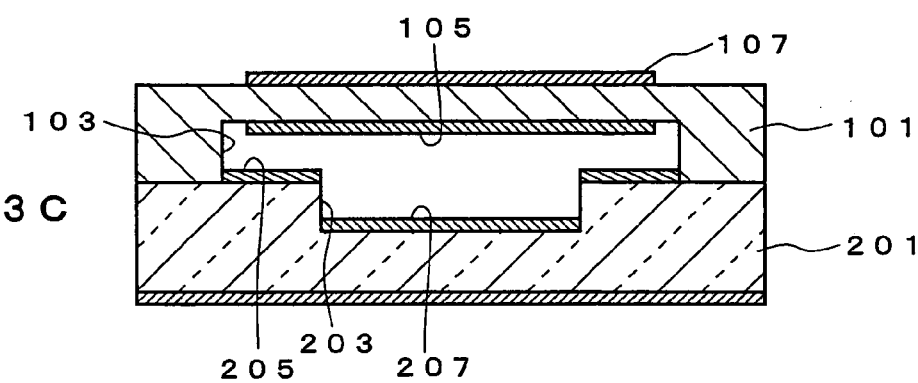

As shown in FIG. 3(C), the first substrate 100 and second substrate 200 prepared as described above are bonded. Specifically, the first substrate 100 and second substrate 200 are bonded such that the first concave portion 103 and second concave portion 203 face each other.

When the bonding of the first substrate 100 and second substrate 200 is conducted by using a silicon substrate as the first substrate 100, and glass containing alkali metals such as borosilicate glass as the second substrate 200, such bonding may be pursuant to anodic bonding. According to anodic bonding, the first substrate 100 and second substrate 200 can be directly bonded easily without having to use an adhesive agent. Further, bonding methods other than anodic bonding may be employed, and, for instance, alloyed junction via metalization such as hot press bonding, Au—Au bonding and solder bonding, or bonding with an adhesive agent may also be employed.

Figure 3D:
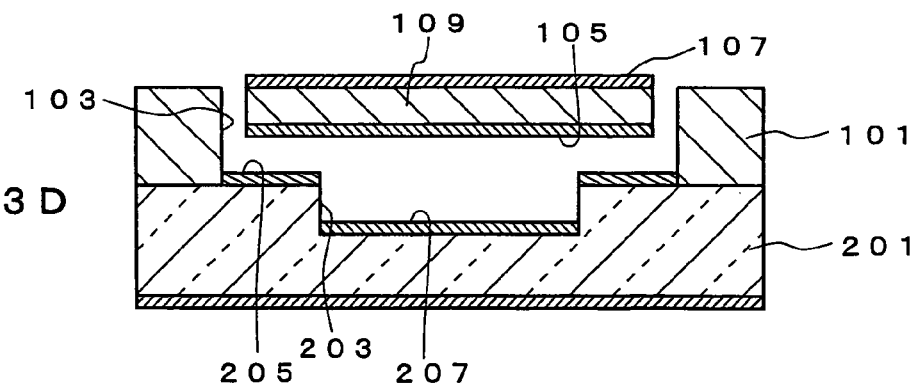

As shown in FIG. 3(D), a moving part 109 is formed. For example, a resist material is applied to form a photoresist film as the etching protective film, and patterning processing is performed with the photolithography technique so as to form a pattern of the moving part 109 and a hinge part 113 (c.f. FIG. 1(B)) connecting the moving part 109 and first substrate 100. Thereafter, for example, the moving part 109 is obtained by performing dry etching with etching gas such as $SF_6$.

According to the optical modulator 1 of the present embodiment, since an optical gap (initial interval between the movable reflection film and fixed reflection film) is formed for determining the wavelength of light to be emitted based on a first substrate 100 having a first concave portion 103 and a second substrate 200 having a second concave portion 203, there is no need to perform underetching to the sacrifice layer. Thus, there is no need to form a release hole for introducing the etching solution into the sacrifice layer, and it will not be necessary to reduce the area which works the power for driving the movable reflection film. Further, this will also prevent problems such as sticking phenomenon caused by the surface tension of the etching solution arising between the movable reflection film and fixed reflection film. Moreover, since the manufacture of the optical modulator will be possible by bonding the substrates having a concave portion formed thereon, such manufacture can be simplified. In addition, with the conventional method of forming a sacrifice layer, forming a movable reflection film thereon, and thereafter removing the sacrifice layer, variations in the gap would occur depending on the deposition conditions of the sacrifice layer. With the present invention, however, since the depth of the formed concave portion will in itself prescribe the initial spacing of the movable reflection film and the fixed reflection film without having to go through the sacrifice layer, the initial spacing of the optical gap between the movable reflection film and fixed reflection film can be controlled accurately. Further, since the size of the diameter of the first concave portion of the first substrate and the second concave portion of the second substrate is different, a step will be formed with the first concave portion and second concave portion. As a result of using this step to form a working part such as an electrostatic electrode which generates power for driving the movable reflection film at the periphery of the second concave portion of the second substrate, the distance between the working part and the movable reflection film can be shortened while broadly securing the area that can be used for modulating light, and the driving power can be reduced thereby.

Incidentally, there is no particular limitation on the shape of the moving part 109, and this may be an approximate circle, spiral, or possessing a pore. Further, there is also no particular limitation on the shape and quantity of the hinge part 113 for connecting the moving part 109 and first substrate 100.

Further, in the foregoing example, a case was explained where a movable reflection film 105 is formed as the insulation film on the overall face of the moving part 109 so as to prevent electrical short circuits caused by the moving part 109 as the electrode coming in contact with the fixed electrode 205. Nevertheless, this is not limited thereto, and an insulation film such as $SiO_2$ may be formed separately to a location where the moving part 109 comes into contact with the fixed electrode 205. Moreover, an insulation film may also be provided to the upper face of the fixed electrode 205. This kind of insulation film, for example, may be formed via the thermal oxidation of silicon or the deposition of $SiO_2$ employing the TEOS (Tetra Ethyl Ortho Silicate)-CVD device.

Further, in the foregoing description, although the movable reflection film 105 and antireflection film 107 were both formed in the process of FIG. 3(B), the antireflection film 107 may be formed subsequently after forming the moving part 109 of FIG. 3(D). As a result of forming the antireflection film 107 after forming the moving part 109, for example, the thermal influence to the antireflection film 107 upon performing heat treatment for the bonding of the first substrate 100 and second substrate 200, or the influence of the etching processing upon forming the moving part 109 can be prevented. Incidentally, this is the same in the subsequent embodiments.

<Second Embodiment>

In the first embodiment, a case was explained using a silicon substrate as the first substrate. In the present embodiment, a case is explained for using a substrate 307 having an SOI (Silicon on Insulator) structure in which an insulating layer such as a SiO₂ layer is interposed between the silicon layers 301, 305 is used as the first substrate.

FIG. 4 is a process drawing for explaining the manufacturing method of an optical modulator pertaining to the second embodiment. In FIG. 4, the components that correspond to FIG. 2 and FIG. 3 are given the same reference numeral, and the explanation thereof is omitted.

Figure 4A:
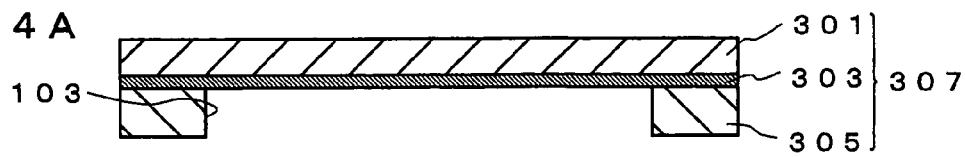
FIG. 4(A) to FIG. 4(E) comprise process drawings for explaining the manufacturing method of the optical modulator according to the second embodiment.

As shown in FIG. 4(A), an SOI substrate 307 constituted from a silicon layer 305 (also referred to as a base silicon layer), and a SiO₂ layer 303 and silicon layer 301 (also referred to as an upper silicon layer, active layer) is prepared as the first substrate so as to form the concave portion 103.

As the SOI substrate, an SOI substrate in which an insulating layer and silicon layer are formed on the silicon substrate via the CVD method, or a bonded substrate may be used. Further, a substrate having formed thereon an oxide film layer by injecting oxygen ion into the silicon substrate may also be used. Incidentally, since the silicon layer 301 to subsequently become the moving part 109 will work as an electrode, preferably, impurities such as boron are injected to improve the conductivity.

As the SOI substrate 307, specifically, a bonded substrate in which another Si substrate is added to the Si substrate deposited with an insulation film (insulating layer) such as SiO₂ may also be used. Further, a substrate in which high concentration oxygen ion is injected into the Si substrate, and thereafter subjecting this to heat treatment at a high temperature of 1300° C. so as to form a BOX (Buried Oxide) layer may also be used.

Although there is no particular limitation on the thickness of the respective layers constituting the SOI substrate, for example, employed is a silicon layer 305 (also referred to as a base silicon layer) that is roughly 500 μm, a SiO₂ layer 303 that is roughly 4 μm, a silicon layer 301 (also referred to as an upper silicon layer, active layer) that is roughly 10 μm.

The silicon layer 305 is made to be a desired thickness of, for example, 0.5 to 100 μm, and preferably 1 to 10 μm via grinding or polishing.

Next, for example, a resist material is applied to the silicon layer 305 of the SOI substrate 307 to form a photoresist film as the etching protective film, and patterning processing is performed with the photolithography technique so as to form a prescribed pattern. Thereafter, for example, etching processing via wet etching employing an alkali solution such as KOH₁ or dry etching employing XeF₂ or the like is performed to form the concave portion 103. Further, polishing may be performed instead of the etching processing.

Here, since the SiO₂ layer 303 functions as the etching stopper, the depth of the concave portion 103 can be controlled accurately without having to control the etching time stringently.

The detailed etching conditions are explained below. Foremost, the wet etching processing is explained.

An etching protective film is formed as described above, and the SOI substrate 307 subject to patterning processing is placed inside a KOH solution having a concentration of, for example 1 to 40 wt %, and preferably around 10 wt %. Here, the following reaction will progress on the SOI substrate 307:

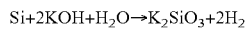

Since the Si etching rate with the KOH solution is considerably greater than the etching rate of the SiO₂ layer, the SiO₂ layer will function as the etching stopper. As a result, the concave portion 103 can be formed with an accurate deepness.

Incidentally, as the etching solution to be employed in the wet etching, in addition to the KOH solution, TMAH solution, EPD solution or hydrazine solution may also be used. If wet etching is employed, productivity will improve since batch processing is possible.

Next, the dry etching processing is explained.

The foregoing etching protective film is formed inside a chamber, the SOI 307 subject to patterning processing is placed therein, and, for example, XeF₂ having a pressure of 390 Pa is introduced therein for 60 seconds. Here, the following reaction will progress on the SOI substrate 307:

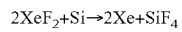

With the dry etching employing XeF₂, since this is considerably greater than the etching rate of the SiO₂ layer, the SiO₂ layer functions as the etching stopper. As a result, the concave portion 103 can be formed with an accurate deepness. With the dry etching employing XeF₂, since plasma is not used, influence of damage or the like will not occur easily due to the area other than the area to where the concave portion 103 of the SOI substrate 307 is to be formed. Incidentally, plasma etching employing CF₄ or SF₆ may also be performed.

Figure 4B:
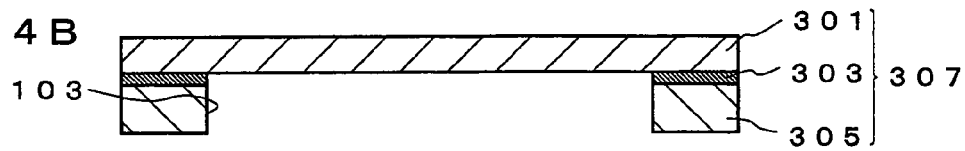

Next, as shown in FIG. 4(B), the SiO₂ layer 303 inside the concave portion 103 is removed. Specifically, the removal of the SiO₂ layer is conducted by wet etching processing employing an HF solution such as hydrofluoric acid solution.

Figure 4C:
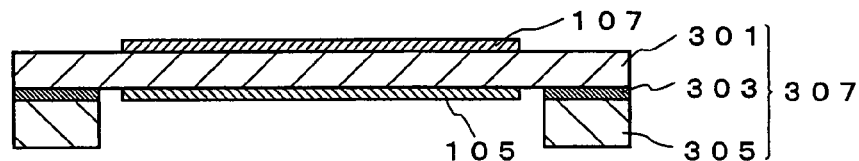
Figure 4D:
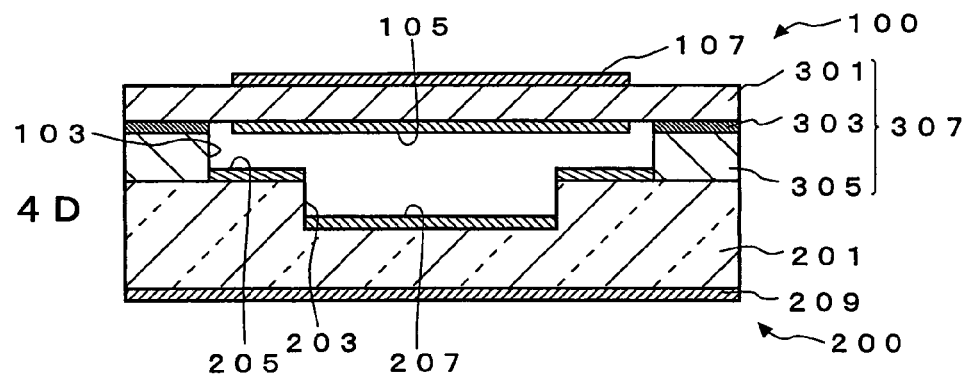
Figure 4E:
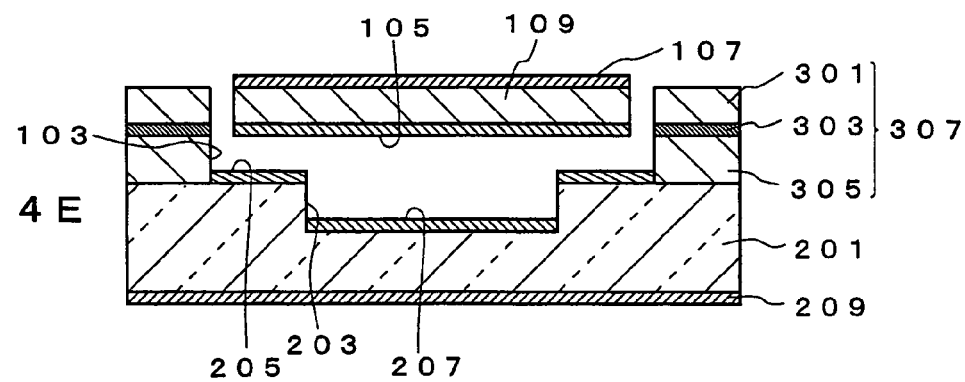

The subsequent processes are similarly conducted as with FIG. 3(B) to FIG. 3 (D) of the first embodiment (FIG. 4(C) to FIG. 4(E)), and the optical modulator 1 is formed thereby. Incidentally, the second substrate 200 employed in the first embodiment can also be used here.

According to the present embodiment, since an SOI substrate 307 is being used, upon forming the concave portion 103, the SiO₂ layer 303 as the insulating layer may be used as the etching stopper. Therefore, a concave portion 103 having an accurate depth can be formed without have to stringently adjust the etching processing time. Accordingly, a high precision optical modulator can be manufactured easily.

<Third Embodiment>

In the second embodiment, a case was explained of using an SOI substrate 307 formed from a silicon layer 301, SiO₂ layer 303 and silicon layer 305 as the first substrate. In the present embodiment, a case is explained of using an SOI substrate 401 having a five-layer structure of a silicon layer 401, SiO₂ layer 403, silicon layer 405, SiO₂ layer 407 and silicon layer 409 as the first substrate.

FIG. 5 is a process drawing for explaining the manufacturing method of an optical modulator pertaining to the third embodiment. In FIG. 5, components corresponding to FIG. 2 and FIG. 3 are given the same reference numeral and the explanation thereof is omitted.

Figure 5A:
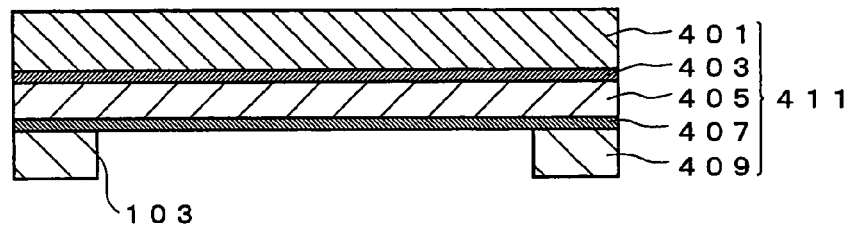
FIG. 5(A) to FIG. 5(E) comprise process drawings for explaining the manufacturing method of the optical modulator according to the third embodiment.
Figure 5B:
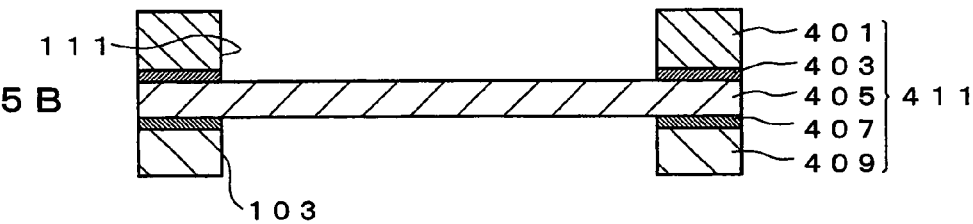

As shown in FIG. 5(A) and FIG. 5(B), an SOI substrate 411 having a five-layer structure of a silicon layer 401, SiO₂ layer 403, silicon layer 405, SiO₂ layer 407 and silicon layer 409 is prepared to form a concave portion 111 and concave portion 103 to the silicon layer 401 and silicon layer 409 of the SOI substrate 411, respectively. The formation of the concave portion 111 and concave portion 103 is conducted with the same method as the process of FIG. 4(A) of the second embodiment.

Figure 5C:
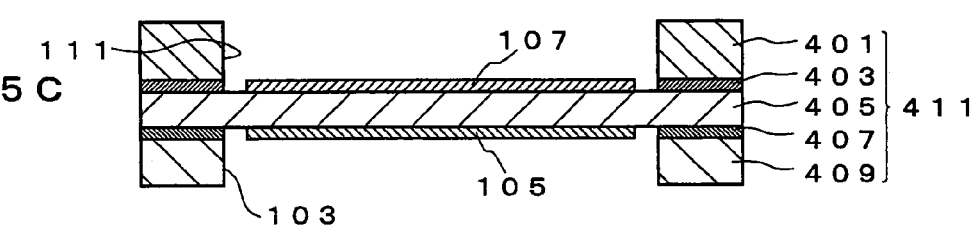
Figure 5D:
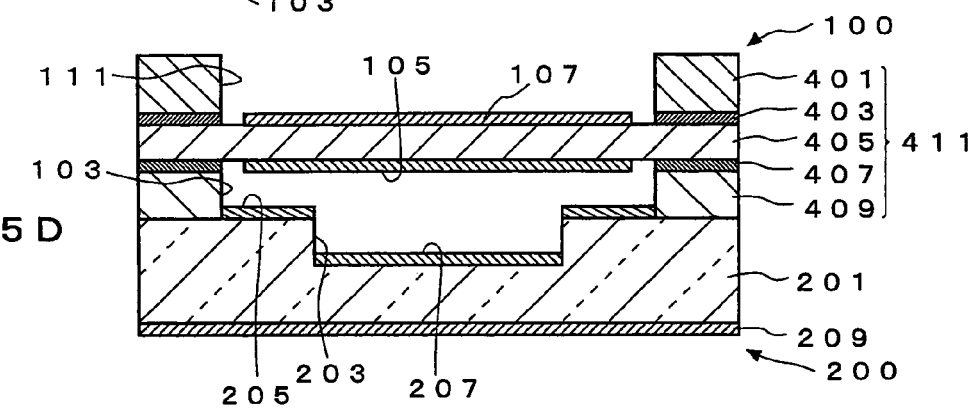
Figure 5E:
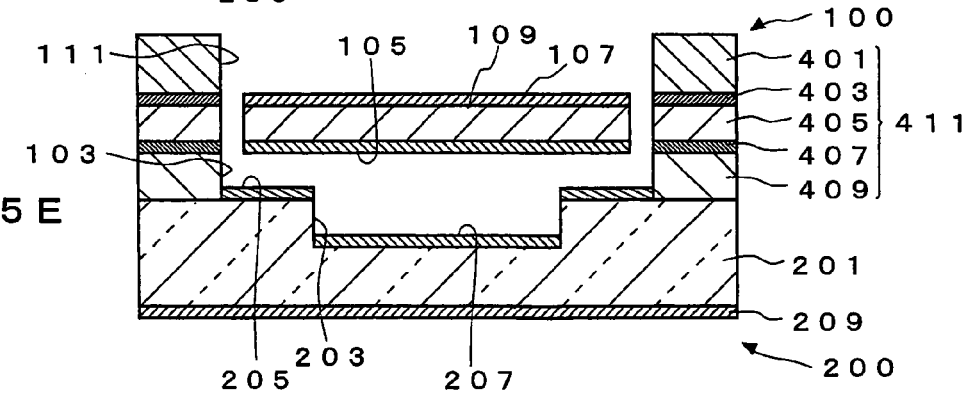

Next, as shown in FIG. 5(C), a movable reflection film 105 is formed on the bottom part of the concave portion 103, and an antireflection film 107 is formed on the bottom part of the concave portion 111. The formation of the movable reflection film 105 and antireflection film 107 is conducted with the same method as the process of FIG. 3(B) of the first embodiment.

Next, the optical modulator 1 is manufactured with the same method as the processes of FIG. 3(C) and FIG. 3(D) of the first embodiment (c.f. (FIG. 5(D) and FIG. 5(E)).

According to the present embodiment, the SOI substrate 411 having a five-layer structure is used as the first substrate 100, and the moving part 109 is formed by forming a concave portion 111 and concave portion 103 on both faces of the SOI substrate 411. Therefore, even after the formation of the concave portion 111 and concave portion 103, since the thickness of the area other than the area where the concave portion 111 and concave portion 103 of the first substrate 100 are formed will remain thick, the strength of the first substrate 100 will improve even after the formation of the concave portion, and the handling thereof can be facilitated. Moreover, it will be possible to avoid damages during the operation of the first substrate 100, and the production yield will improve.

<Fourth Embodiment>

In the present embodiment, the SOI substrate 307 similar to the one employed in the second embodiment; that is, the SOI substrate 307 having an SOI structure in which an insulating layer 303 such as an $SiO_2$ layer is interposed between the silicon layers 301, 305, is used as the first substrate.

In the present embodiment, a case is explained in which a support member is bonded to the first substrate for facilitating the handling the first substrate during the process and to reinforce the strength thereof.

FIG. 6 is a process drawing for explaining the manufacturing method of the optical modulator pertaining to the fourth embodiment. In FIG. 6, components corresponding to FIG. 2 to FIG. 4 are given the same reference numeral and the explanation thereof is omitted.

Figure 6A:
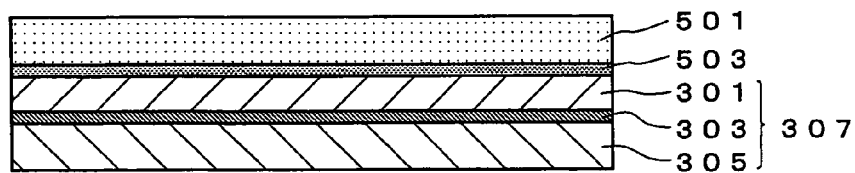
FIG. 6(A) to FIG. 6(F) comprise process drawings for explaining the manufacturing method of the optical modulator according to the fourth embodiment.

As shown in FIG. 6(A), an SOI substrate 307 having a support member bonded thereto is prepared. As the SOI substrate, the SOI substrate 307 constituted from a silicon layer 305 (also referred to as a base silicon layer), and a $SiO_2$ layer 303 and silicon layer 301 (also referred to as an upper silicon layer, active layer) used in the second embodiment may also be used here.

Further, as the support member (support wafer) 501, for example, a glass substrate or the like is used. The SOI [substrate] 307 and support member 501 are boded with a method that enables subsequent disbanding. Specifically, for example, bonding may be carried out with an adhesive agent that can be easily disbonded with a temperature change (e.g., heating) or irradiation of light, or a soluble adhesive agent that can be eluded with a solvent.

The thickness of the silicon layer 305 of the SOI substrate 307 may be adjusted via grinding with a method such as chemical mechanical processing (CMP) after the bonding with the support member 501.

Figure 6B:
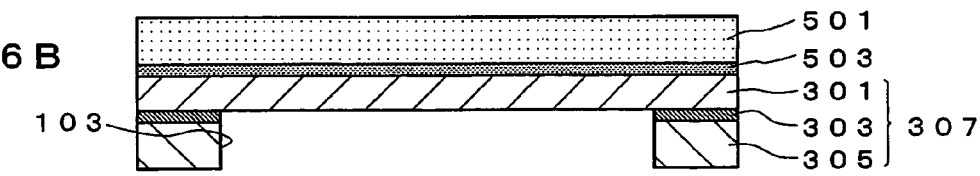

Next, as shown in FIG. 6(B), the concave portion 103 is formed by performing phased etching to the silicon layer 305 and SiO2 layer 303. Incidentally, this process is conducted with the same method as the process of FIG. 5(A) of the second embodiment.

Figure 6C:
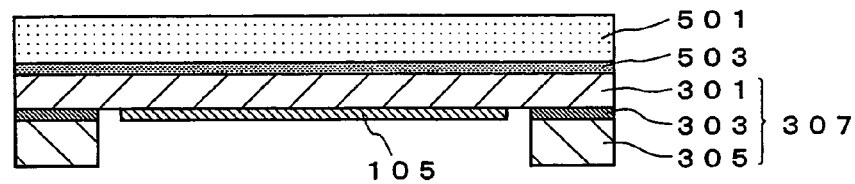
Figure 6D:
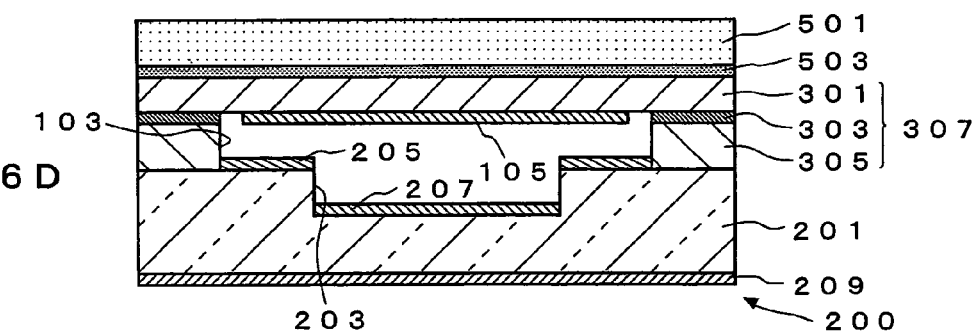

Thereafter, as shown in FIG. 6(C) and FIG. 6(D), a movable reflection film 105 is formed on the bottom part of the concave portion 103, and the SOI substrate 307 is bonded with the second substrate 200 as with the first embodiment. This process is carried out with the same method as FIG. 3(B) and FIG. 3(C) of the first embodiment.

Figure 6E:
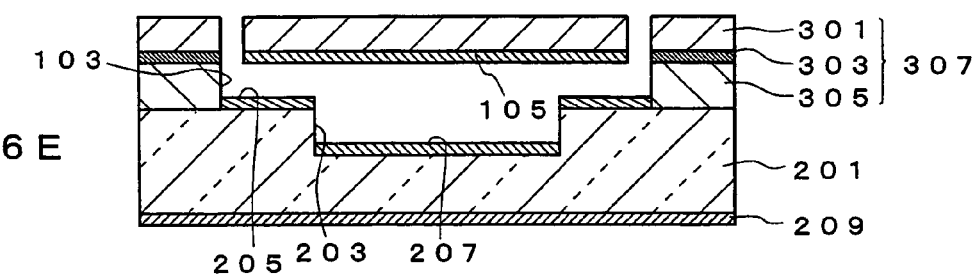

Next, as shown in FIG. 6(E), the moving part 109 is formed after disbanding the support member 501. Thereupon, when employing a thermally disbonding adhesive agent 503 for bonding the support member 501 and SOI substrate 307, disbanding is performed with heat treatment. Further, when using an adhesive agent 503 soluble in a certain solvent, disbanding is performed with a prescribed solvent. The same process as with the first embodiment is used to form the moving part 109.

Figure 6F:
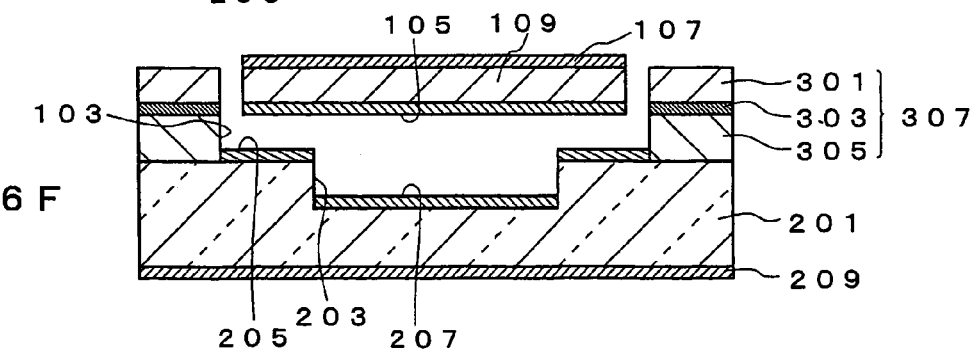

Thereafter, as shown in FIG. 6(F), the optical modulator 1 can be manufactured by forming the antireflection film 107 to the face opposite to the face where the movable reflection film 105 of the moving part 109 is formed.

According to the present embodiment, as a result of using the support member 501, it will be possible to reinforce the strength of the first substrate 100. Thus, since the strength can be retain even when the thickness of the first substrate 100 is formed thin, the handling thereof will be facilitated, and the operability will improve. Moreover, it will be possible to avoid damages during the operation of the first substrate 100, and the production yield will improve. In addition, since it will be possible to make the thickness of the moving part 109 thin, the movability of the optical modulator will increase. Further, the depth of the concave portion 103, which is the electrostatic gap Y for working the electrostatic force, can be made shallow, electrostatic force can be worked more effectively.

Incidentally, in this example, although an SOI substrate was used as the first substrate 100, the same effect can be yielded with the support member 501 by using a silicon substrate as the first substrate 100, bonding the support member 501 thereto, and manufacturing the optical modulator 1 with the same process.

<Fifth Embodiment>

In the present embodiment, a case is explained where the first substrate is constituted from a bottom substrate and a frame body.

FIG. 7 is a process drawing for explaining the manufacturing method of the optical modulator pertaining to the fifth embodiment. In FIG. 7, components corresponding to FIG. 2 to FIG. 6 are given the same reference numeral and the explanation thereof is omitted.

Figure 7A:
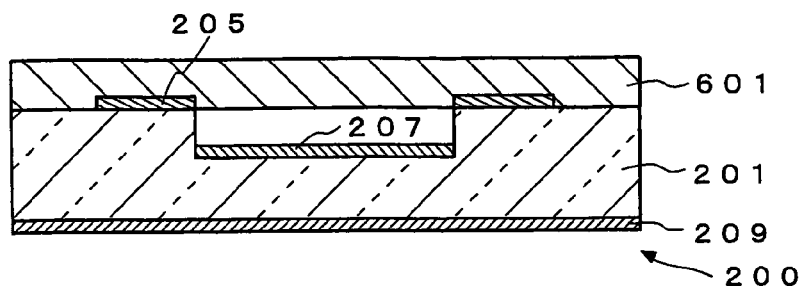
FIG. 7(A) to FIG. 7(E) comprise process drawings for explaining the manufacturing method of the optical modulator according to the fifth embodiment.

As shown in FIG. 7(A), a substrate 601 constituted from silicon or the like is bonded to the second substrate 200 prepared with the same method as the first embodiment. This substrate 601 is used as a spacer, and the thickness of this substrate 601 will subsequently prescribe the electrostatic gap Y and the movable range of the moving part 109.

When the bonding of the substrate 601 and second substrate 200 is conducted by using a silicon substrate as the substrate 601, and glass containing alkali metals such as borosilicate glass as the second substrate 200, such bonding may be pursuant to anodic bonding. Further, bonding methods other than anodic bonding may be employed, and, for instance, alloyed junction via metalization such as hot press bonding, Au—Au bonding and solder bonding, or bonding with an adhesive agent may also be employed.

Figure 7B:
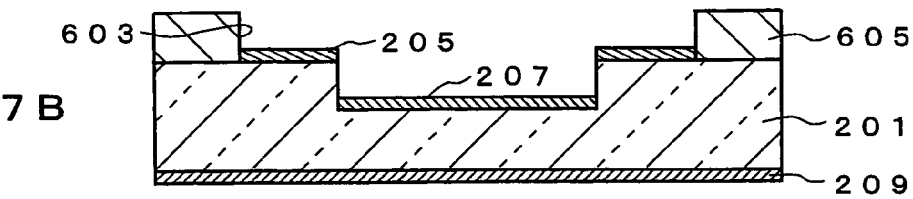

As shown in FIG. 7(B), a through hole 603 is formed in the substrate 601, and a bottom substrate 607 to be bonded subsequently and a frame body 605 for forming a concave portion 103 are formed. The formation of the through hole 603, for example, is conducted by dry etching employing XeF$_2$. Incidentally, other gas may be used as the etching gas, or wet etching employing an alkali solution such as KOH may also be performed.

Figure 7C:
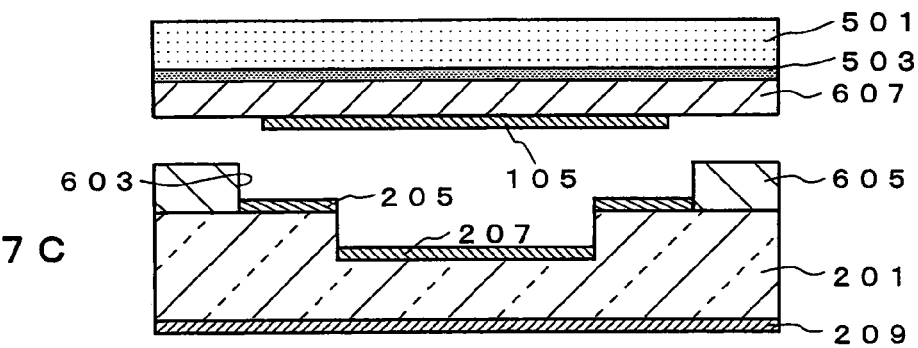

As shown in FIG. 7(C), a bottom substrate 607 supported with the support member 501 to be bonded to the second substrate 200, to which a frame body 605 has been bonded, is prepared.

The bottom substrate 607 is bonded to the support member 501 via an adhesive agent 503, for example, which was used in the fourth embodiment. A silicon substrate is used as the bottom substrate 607. Regarding the bottom substrate 607, after being bonded to the support member 501, the thickness thereof may be adjusted by grinding via a method such as CMP. The thickness of the bottom substrate 607 will become the thickness of the moving part 109 formed subsequently.

Further, a movable reflection film 105 is formed on the face opposite to the face to which the support member 501 of the bottom substrate 607 is formed. The movable reflection film 105 may be formed with the same method as the first embodiment.

Figure 7D:
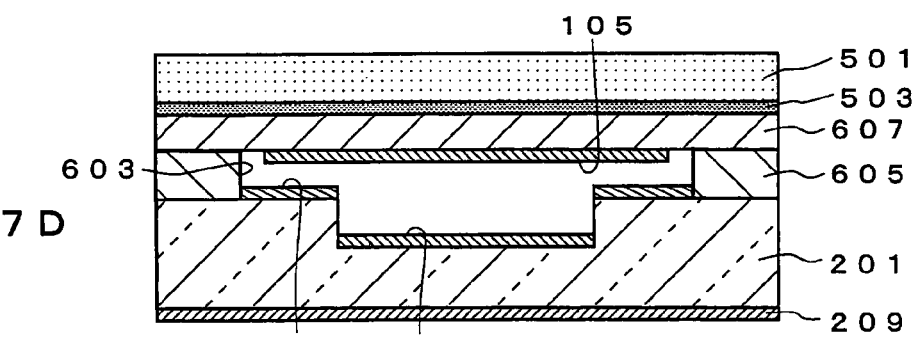

As shown in FIG. 7(D), the frame body 605 and bottom substrate 607 are bonded. When the bonding of the frame body 605 and bottom substrate 607 is conducted with the frame body 605 and bottom substrate 607 being constituted from silicon, for instance, surface tension bonding may be employed. Further, in addition to the above, when employing low melting point glass, alloyed junction via metalization such as hot press bonding, Au—Au bonding and solder bonding, or bonding with an adhesive agent may also be employed.

Figure 7E:
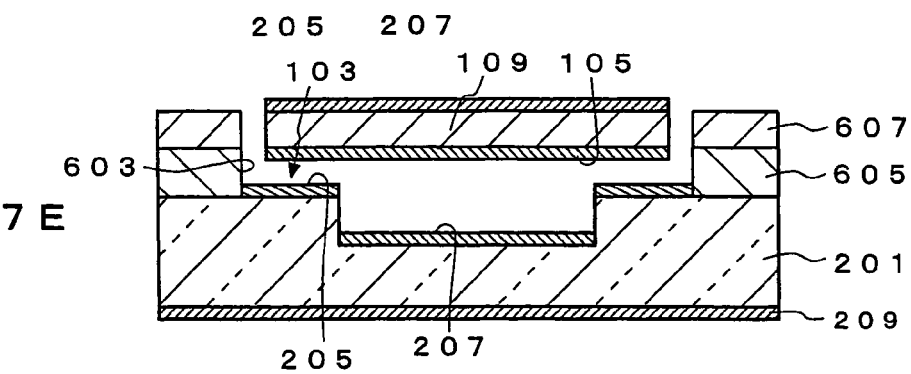

Thereafter, as shown in FIG. 7(E), with the same processes of FIG. 6(E) and FIG. 6(F) of the fourth embodiment, by forming the antireflection film 107 by disbanding the support member 501, the optical modulator 1 can be obtained.

According to the present embodiment, since the concave portion 103 is formed with the frame body 605 and bottom substrate 607, the movable range of the moving part 109 and the electrostatic gap Y can be prescribed with the thickness of the frame body 605. Further, as a result of adjusting the thickness of the substrate 601 to be used in the frame body 605, the depth of the concave portion 103 will be determined. Thus, there is no need to stringently control the etching time. Accordingly, it is possible to provide an optical modulator 1 with improved precision with a simple method.

I claim:

1. An optical modulator, comprising:
    a first substrate having a first concave portion with a bottom part thereof being a moving part, and a movable reflection film formed on said moving part;
    a second substrate provided with a second concave portion having a diameter that is smaller than a diameter of said first concave portion at a position facing said first concave portion, and a fixed reflection film formed on a bottom part of said second concave portion; and
    wherein the depth of said first concave portion prescribes the movable range of said movable reflection film, and an optical gap is prescribed based on the spacing between said movable reflection film and said fixed reflection film.

2. An optical modulator according to claim 1, wherein said first substrate is a silicon substrate, and said second substrate is a glass substrate.

3. An optical modulator according to claim 1, wherein said first substrate is a laminated layer comprising an insulating layer between a plurality of silicon layers, and said second substrate is a glass substrate.

4. An optical modulator according to claim 1, wherein said moving part is constituted to be drivable with the electrostatic force generated by applying voltage to said moving part and an electrode provided to said second substrate.

5. An optical modulator according to claim 4, wherein said movable reflection film is formed on the overall face facing said second concave portion of said moving part, and said movable reflection film possesses electric insulation.

6. An optical modulator according to claim 1, wherein said first substrate is constituted from a bottom substrate constituting said bottom part, and a frame body bonded to said bottom substrate.

7. A manufacturing method of an optical modulator, comprising:
    a first step of etching one face of a first substrate so as to form a first concave portion for prescribing the movable range of a movable reflection film,
    a second step of etching one face of a second substrate so as to form a second concave portion having a diameter that is smaller than a diameter of said first concave portion;
    a third step of bonding said first substrate and said second substrate such that said first concave portion and said second concave portion face each other; and
    a fourth step of removing a bottom part of said first concave portion while leaving an area to become a moving part so as to form a moving part to said bottom part.

8. A manufacturing method of an optical modulator according to claim 7, wherein said first substrate is a silicon substrate, and said second substrate is a glass substrate.

9. A manufacturing method of an optical modulator according to claim 7, wherein said first substrate is a laminated layer comprising an insulating layer between a plurality of silicon layers, and said first concave portion is formed by using said insulating layer as an etching stopper in said first step.

10. A manufacturing method of an optical modulator according to claim 9, wherein said first substrate has at least a double-layered insulating layer between a plurality of silicon layers, and further comprises a step of forming a third concave portion by using said insulating layer as an etching stopper at a position corresponding to said first concave portion of the face opposite to the face to which said first concave portion of said first substrate is formed in said first step.

11. A manufacturing method of an optical modulator according to claim 7, wherein, at least in said third step, a removable support member for supporting said first substrate is mounted on said first substrate.

12. A manufacturing method of an optical modulator according to claim 7, wherein, before said third step, an electrode is formed in the periphery of said second concave portion of the glass substrate obtained in said second step and at a position facing said first concave portion.

13. A manufacturing method of an optical modulator according to claim 7, wherein, before said third step, a reflecting layer to become a movable reflection film is formed at the bottom face of said first concave portion.

14. A manufacturing method of an optical modulator, comprising:
- a first step of forming a concave portion by etching one face of a glass substrate;
- a second step of bonding a first silicon substrate to the face to which the concave portion of said glass substrate is formed;
- a third step of forming a pore that is larger than said concave portion at a position corresponding to said concave portion of said glass substrate;
- a fourth step of bonding a second silicon substrate to a face on the opposite side of said first silicon substrate; and
- a fifth step of removing said second silicon substrate while leaving an area to become a moving part so as to form a moving part to said second silicon substrate.

15. A manufacturing method of an optical modulator according to claim 14, wherein, at least in said fourth step, a removable support member for supporting said second silicon substrate is mounted on said second silicon substrate.

16. An optical modulator, comprising:
- a first substrate constituted from a material capable of transmitting light and having a concave portion formed thereon;
- a second substrate having a moving part formed thereon for covering said concave portion;
- a fixed reflection film formed at a bottom part of said concave portion;
- a movable reflection film formed on said moving part;
- biasing means for biasing said moving part to the bottom part of said concave portion; and
- a stopper for retaining said movable reflection film and said fixed reflection film at a predetermined interval;
- wherein the wavelength of light to be emitted can be determined based on the interval between said movable reflection film and said fixed reflection film.

17. An optical modulator according to claim 16, wherein said stopper is a step formed along the edge of said concave portion.

18. An optical modulator according to claim 16, wherein said biasing means is a drive electrode formed along the edge of said concave portion.

19. An optical modulator comprising:
- a first substrate having a first concave portion defined by side walls and a moveable portion connected to the side walls by hinges, the first substrate having a lower face surrounding the first concave portion;
- a first reflection film formed on an inner surface of said movable portion;
- a second substrate having a second concave portion having a diameter that is smaller than a diameter of said first concave portion, the second substrate having an upper face surrounding the second concave portion;
- a second reflection film formed on a inner surface of said second concave portion; and
- said lower face of the first substrate being connected to the upper face of the second substrate so that the first reflection film is facing yet spaced from the second reflection film.

* * * * *